(12) United States Patent
Duda

(10) Patent No.: US 9,491,268 B2
(45) Date of Patent: Nov. 8, 2016

(54) METHOD AND DEVICES FOR SESSION TIMEOUT MANAGEMENT

(71) Applicant: Infinite Convergence Solutions, Inc, Arlington Heights, IL (US)

(72) Inventor: Michael Duda, Naperville, IL (US)

(73) Assignee: Infinite Convergence Solutions, Inc., Arlington Heights, IL (US)

( * ) Notice: Subject to any disclaimer, the term of this patent is extended or adjusted under 35 U.S.C. 154(b) by 102 days.

(21) Appl. No.: 14/192,423

(22) Filed: Feb. 27, 2014

(65) Prior Publication Data

US 2014/0250165 A1    Sep. 4, 2014

Related U.S. Application Data

(60) Provisional application No. 61/771,379, filed on Mar. 1, 2013.

(51) Int. Cl.
*H04L 29/08* (2006.01)
*H04L 12/58* (2006.01)
*H04L 29/06* (2006.01)
*G06F 15/16* (2006.01)

(52) U.S. Cl.
CPC ............. *H04L 69/28* (2013.01); *H04L 67/145* (2013.01)

(58) Field of Classification Search
USPC ....... 709/203, 219, 206, 246, 229, 232, 227, 709/226
See application file for complete search history.

(56) References Cited

U.S. PATENT DOCUMENTS

| | | | | |
|---|---|---|---|---|
| 7,194,252 B1* | 3/2007 | Jordan, Jr. | .......... | H04L 12/5835 455/411 |
| 7,873,994 B1* | 1/2011 | Wu | ........ | H04L 63/102 713/151 |
| 8,495,222 B2* | 7/2013 | Yamamoto | .............. | H04L 67/36 709/227 |
| 9,215,200 B2* | 12/2015 | Ordogh | .................... | H04L 51/22 |
| 2002/0174194 A1* | 11/2002 | Mooney | .................. | H04L 12/58 709/219 |
| 2007/0101406 A1* | 5/2007 | Zavalkovsky | ...... | H04L 63/0815 726/4 |
| 2008/0222263 A1* | 9/2008 | Wu | ....... | H04L 12/5825 709/206 |
| 2008/0256204 A1* | 10/2008 | Kamat | .................. | H04L 12/587 709/206 |
| 2010/0235901 A1* | 9/2010 | Simpkins | ................ | H04L 63/08 726/12 |
| 2011/0258453 A1* | 10/2011 | Mansfield | ........... | H04L 63/0823 713/173 |
| 2012/0303774 A1* | 11/2012 | Wilson | .................... | H04L 67/26 709/223 |
| 2014/0317738 A1* | 10/2014 | Be'ery | .................... | H04L 63/14 726/23 |

* cited by examiner

*Primary Examiner* — Jude Jean Gilles
(74) *Attorney, Agent, or Firm* — Russell E. Sorber

(57) ABSTRACT

This innovation provides a method and devices to manage IMAP Session timeout values by adding one or more proprietary parameters to the IMAP protocol. This provides the ability to modify the IMAP session timeout value after the IMAP session has been established and before the IMAP session expires. The mobile client may then choose to modify the timing of the IDLE message to the server based upon the newly received IMAP session timeout value.

17 Claims, 3 Drawing Sheets

METHOD AND DEVICES FOR SESSION TIMEOUT MANAGEMENT

CROSS-REFERENCE TO RELATED APPLICATIONS

This application claims the benefit of U.S. Provisional Patent Application No. 61/771,379 filed on Mar. 1, 2013 by the present inventor which is incorporated by reference into this application.

FEDERALLY SPONSORED RESEARCH

None.

SEQUENCE LISTING

None.

FIELD OF THE INVENTION

This invention relates to the management of session timeouts between mobile messaging clients and servers.

BACKGROUND OF THE INVENTION

In order to manage resources, many client/server data networks have established session timeout values at the server apparatus. When there is no activity within that period of time the data session is timed out and the message or chat session must be reestablished to the idle client. Currently, under IMAPv4 protocol as described in IETF RFC 3500, client senders of messages may request a session, but does not have exact knowledge of the maximum idle time that the server supports or when it changes. RFC 2177, which addresses the same IMAP protocol, suggests use of the IDLE command from the client to the server every 29 minutes and servers are told to have an idle time of at least 30 minutes. Typically, in a mobile network, due to scarce network resources and limited battery life it is very important for the client to "deregister" well before 30 minutes. This implies that the server setting for IDLE time will be less than 30 minutes as well.

If the timeout value is left at 30 minutes as suggested by the terrestrial network standard, then more resources will needlessly be in use in the cellular network while the session is maintained. If an IMAP server sets a timeout value less than 30 minutes, sooner than the standard dictates, then many IMAPv4 compliant mobile devices, may issue an IDLE command at 29 minute intervals as per the RFC suggestion. These mobile devices will often experience and IDLE session timeout and closure due to inactivity detected by the server. This last scenario implies additional bandwidth and data transmitted in order to reestablish the sessions. What is needed is a modification to the known protocol to share the exact idle timeout value set at the server with the client device.

SUMMARY OF INVENTION

This invention provides the client messaging device with the session timeout value set at the server. The client may request this value at any time. The client device then performs an activity to reset the server activity timer just in time to avoid the overhead of losing and reestablishing a data session.

DRAWINGS

Drawings—List of Reference Numbers

110 Client device, typically a mobile phone, tablet or other messaging device capable of initiating a data session with a server and receiving the session timeout value from the server.
140 A server apparatus that receives requests to and communicates with the client apparatus including communicating the IDLE session timeout value.

GLOSSARY

CLIENT Software that accesses a remote service on another computer.
IETF Internet Engineering Task Force
IDLE IMAP command issued periodically in order to keep a connection active between client and server.
IDLETIMEOUT Response/Parameter added by inventor to the IMAP CONNECT command response to transmit session timeout value to clients. Response/Parameter can be provided in response to other commands such as IMAP IDLE command.
IMAP Internet Message Access Protocol
IP Internet Protocol
MSA Message Storage Application, a Server that stores and provides an IDLE session timeout value. Timeout value may be static or dynamic changing with time of day or with client type.
RFC IETF Request for Comments Document
SELECT IMAP command used by a client to select a particular mailbox on the server. Used in this diagram as an example command.

DETAILED DESCRIPTION

Figure 1:
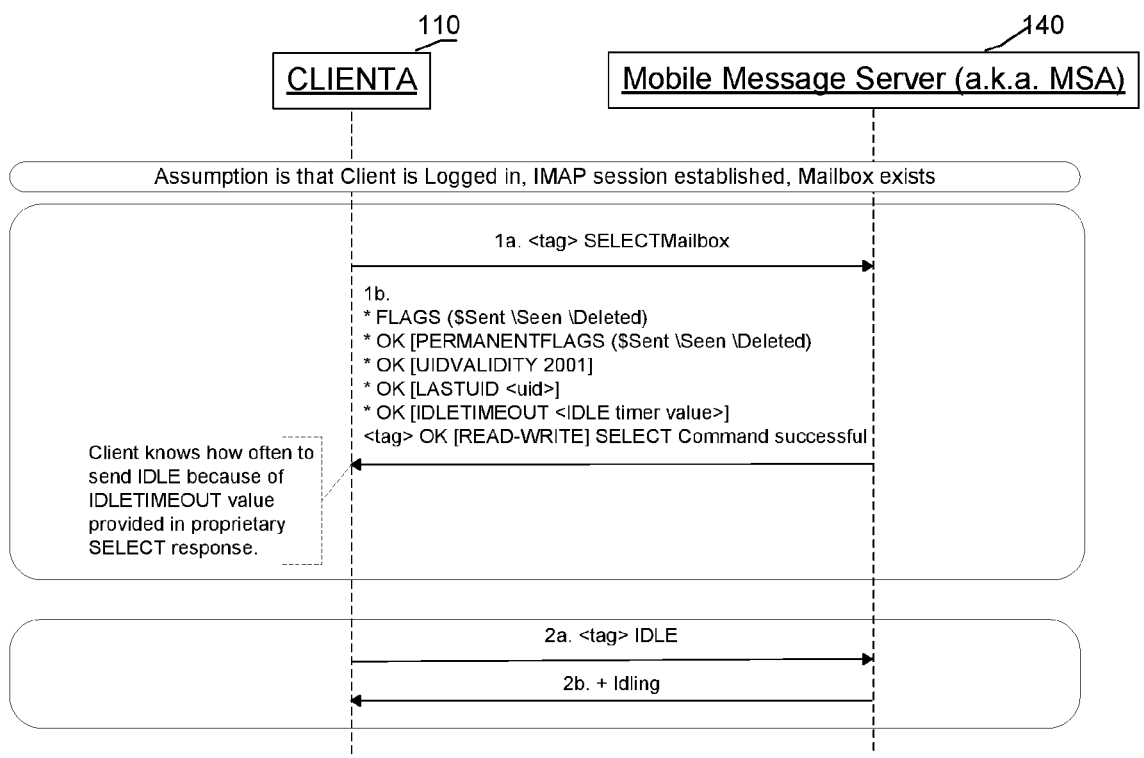
FIG. 1 assumes an IMAP session has been setup and that a mailbox associated with the client exists on the MSA server. (The terms "MSA server", "mobile message server", and "server" are used interchangeably in this document.) The client, ClientA [110], can select the mailbox using the preexisting IMAP protocol command SELECT. In response to the SELECT, command, the server sends data associated with the connection, including the inventor's proprietary IDLETIMEOUTVALUE which contains the exact time at which the session will timeout from inactivity. If no other activity occurs before the timeout value, the client can resend the IMAP IDLE command just before the timeout value expires. The timer is then reinitialized at the server without suspension of service to the client.
Figure 2:
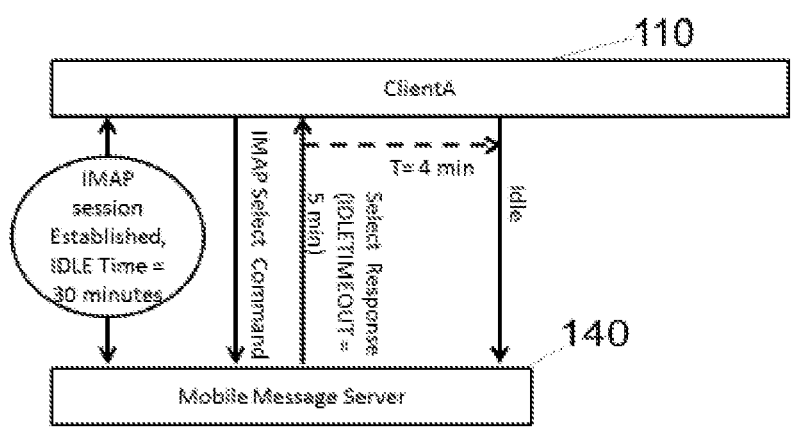
FIG. 2 shows the server making use of the inventor's extension to the IMAP Select command to modify the session timeout value after the IMAP session has been established. Under the preferred embodiment, the client, ClientA[110], recognizes the new parameter and sends the IMAP idle command in 4 minutes, one minute less than the modified session timeout value.
Figure 3:
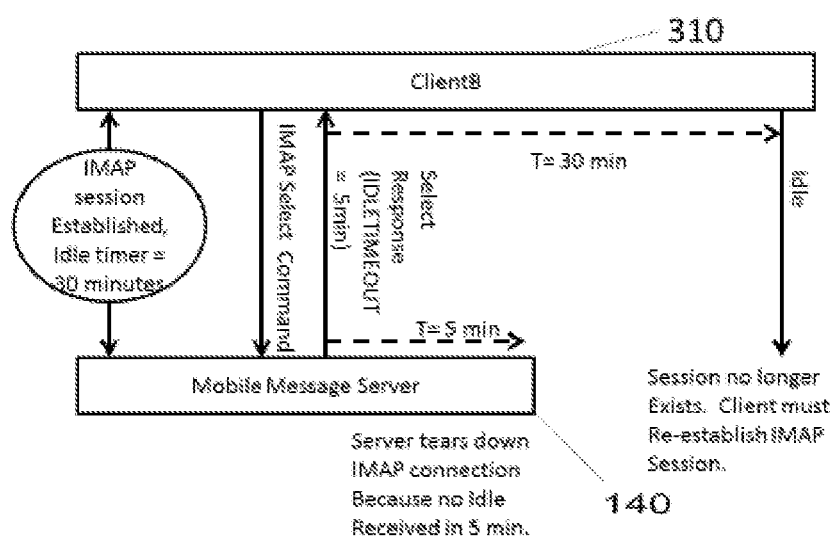
FIG. 3 shows the server making use of the inventor's proprietary extension to the IMAP Select command to modifying the session timeout value after the IMAP session has been established. The legacy client, ClientB [310], however does not recognizes the new parameter and sends the IMAP idle command in 29 minutes, one minute less than the original session timeout (and 24 minutes after the session has expired).

This consists of a better method to manage data sessions between a messaging client and a messaging server. This innovation is a modification to the IMAP protocol used on the client and a modification to protocol used at the server as compared to the well known art. The server is modified to provide a modified IMAP session timeout value in a proprietary IMAP parameter to the client in response to a client command in an IMAP session. Note that this allows for the timeout value to be modified based upon changing network needs or based upon knowledge of the client being used after the IMAP session has already been established and before the session expires.—The client is modified to accept the modified timeout value and issue an IMAP IDLE other command prior to the modified timeout value expiration at the server.

In the preferred embodiment the IMAP protocol is modified, using a proprietary parameter, to return the session timeout value for the session as an addition to the IMAP SELECT command response. Alternately, the modified timeout value can be provided as an additional parameter in the response to other commands including as part of the response by the server to an IMAP IDLE command. Once this information is shared with the client, the client device can change the timing of when the IDLE command or other command is sent.

Timeout values may also be modified by the server depending upon the type of client (such as longer timeout value which could be allowed for a premium client or longer battery life) or the timeout value can be modified based upon, for example, the time of day with a shorter timeout needed during an operator's busy hours.

What is claimed is:

1. A method to extend an IMAP session between a mobile message server apparatus comprising: a storage device comprising computer executable program code; and a processor coupled to the storage device, and a mobile client apparatus comprising a storage device comprising computer executable program code; and a processor coupled to the storage device, where the method further comprises:
   a. storing an original session timeout value on said mobile message server;
   b. establishing an IMAP session between said mobile message server and the mobile client;
   c. modifying the IMAP session timeout value to a new IMAP session timeout value on the mobile message server;
   d. sending the new IMAP session timeout value to the mobile client prior to expiration of the session;
   e. receiving the new IMAP session timeout value and updating the IMAP session timeout value at the client;
   f. the client sending a message to the server prior to expiration of the new IMAP session timeout.

2. The method of claim 1 comprising the mobile message server sending the new IMAP session timeout value to the client as part of a proprietary parameter in a response to the IMAP SELECT command.

3. The method of claim 1 comprising the mobile message server sending the new IMAP session timeout value to the mobile client as part of a proprietary parameter in a response to the IMAP IDLE command.

4. The method of claim 1 comprising modifying the session timeout value in step 1c at the server based upon the time of day.

5. The method of claim 1 comprising modifying the session timeout value in step 1c at the server based upon the type of client.

6. A mobile message server apparatus comprising: a storage device comprising computer executable program code; and a processor coupled to the storage device, wherein the processor executes the computer executable program code which further comprises transmitting a modified IMAP session timeout value to clients in a proprietary IMAP parameter as part of any message after an IMAP Session has been initiated.

7. The server of claim 6 which further comprises transmitting the modified IMAP session timeout value to the client as a response to the IMAP SELECT command.

8. The server of claim 6 which comprises the transmitting the modified IMAP session timeout value to the client as a response to the IMAP IDLE command.

9. The server of claim 6 which additionally comprises a modifiable session timeout value which is modified from the value at the beginning of the IMAP session based upon the time of day.

10. The server of claim 6 which additionally comprises modifying the IMAP session timeout value based upon the type of client.

11. A mobile messaging client apparatus comprising: a storage device comprising computer executable program code; and a processor coupled to the storage device, wherein the processor executes the computer executable program code further comprising receiving a new IMAP session timeout value in a proprietary parameter within the IMAP session as part of any response from the server which is different from the session timeout value at the beginning of the IMAP session.

12. The mobile messaging client of claim 11 comprising receiving the modified session timeout value in a proprietary IMAP parameter in response to an IMAP SELECT message.

13. The mobile messaging client of claim 11 comprising receiving the timeout value in a proprietary IMAP parameter in response to an IMAP IDLE message.

14. The messaging client of claim 11 which further comprises a mobile phone.

15. The messaging client of claim 11 which further comprises a portable tablet device.

16. The method of claim 1 comprising modifying the session timeout value in step 1c at the server based upon the mobile server capacity.

17. The mobile messaging client of claim 11 which further comprises modifying the timing of one or more IMAP IDLE commands sent to the server based upon a new IMAP session timeout value received within the IMAP session from the mobile message server.

* * * * *